(12) United States Patent
Shen et al.

(10) Patent No.: US 8,931,029 B2
(45) Date of Patent: Jan. 6, 2015

(54) TRANSMITTER, RECEIVER AND EXTENDER SYSTEM

(75) Inventors: Fu Chin Shen, Taipei (TW); Kuo-Chan Chien, New Taipei (TW)

(73) Assignee: ATEN International Co., Ltd., Shijr (TW)

( * ) Notice: Subject to any disclaimer, the term of this patent is extended or adjusted under 35 U.S.C. 154(b) by 616 days.

(21) Appl. No.: 13/028,672

(22) Filed: Feb. 16, 2011

(65) Prior Publication Data
US 2011/0216244 A1 Sep. 8, 2011

(30) Foreign Application Priority Data

Mar. 5, 2010 (TW) ................................. 99106533 A

(51) Int. Cl.
*H04N 7/173* (2011.01)
*H04N 5/14* (2006.01)

(52) U.S. Cl.
CPC ....................................... *H04N 5/14* (2013.01)
USPC ........................................................ 725/133

(58) Field of Classification Search
CPC ........................................................ H04N 5/14
USPC .......................................... 725/119, 127, 133
See application file for complete search history.

(56) References Cited

U.S. PATENT DOCUMENTS

| | | | |
|---|---|---|---|
| 6,463,092 B1* | 10/2002 | Kim et al. ...................... 375/219 |
| 7,088,398 B1* | 8/2006 | Wolf et al. ................... 348/423.1 |
| 7,158,593 B2* | 1/2007 | Kim et al. ...................... 375/354 |
| 7,228,116 B2* | 6/2007 | Cheng et al. ................ 455/180.3 |
| 7,936,401 B2* | 5/2011 | Nakajima et al. .............. 348/723 |
| 2007/0052869 A1* | 3/2007 | Priest ............................. 348/735 |
| 2009/0049498 A1* | 2/2009 | Li .................................. 725/127 |
| 2009/0134996 A1* | 5/2009 | White et al. ................... 340/538 |
| 2010/0043045 A1* | 2/2010 | Shakiba et al. ................ 725/119 |
| 2010/0095031 A1* | 4/2010 | Shen et al. ....................... 710/69 |
| 2010/0104029 A1* | 4/2010 | Lee et al. ....................... 375/257 |
| 2010/0118188 A1* | 5/2010 | Nakajima et al. .............. 348/467 |
| 2010/0269137 A1* | 10/2010 | Nakajima et al. ............... 725/39 |
| 2011/0072064 A1* | 3/2011 | Wei et al. ....................... 708/300 |
| 2012/0210384 A1* | 8/2012 | Cirstea et al. ................. 725/127 |
| 2012/0210385 A1* | 8/2012 | Cirstea et al. ................. 725/127 |

FOREIGN PATENT DOCUMENTS

| | | |
|---|---|---|
| CN | 1353530 | 6/2002 |
| EP | 1 959 623 A2 | 8/2008 |
| EP | 2091252 | 8/2009 |

(Continued)

OTHER PUBLICATIONS

Chinese Office Action, dated Mar. 20, 2013 in a counterpart Chinese patent application, No. CN 201010122647.3.

(Continued)

*Primary Examiner* — Nasser Goodarzi
*Assistant Examiner* — Michael B Pierorazio
(74) *Attorney, Agent, or Firm* — Chen Yoshimura LLP

(57) ABSTRACT

A transmitter includes a signal input terminal, multiple loading units and a communication port. The signal input terminal receives a digital video-audio signal, which comprises multiple digital differential signals and multiple single-end/low frequency signals. The loading units respectively load the corresponding single-end/low frequency signals to the digital differential signals to obtain multiple differential mixed signals. A frequency of the digital differential signals is higher than a frequency of the corresponding single-end/low frequency signals. The communication port outputs the differential mixed signals to a receiver via a network cable.

7 Claims, 7 Drawing Sheets

(56) References Cited

FOREIGN PATENT DOCUMENTS

| | | | | |
|---|---|---|---|---|
| EP | 2091252 A1 | * | 8/2009 | |
| EP | 2091253 | | 8/2009 | |
| EP | 2091253 A1 | * | 8/2009 | ............. H04N 5/445 |
| TW | 201113707 A1 | | 4/2011 | |
| TW | 201114206 A1 | | 4/2011 | |

OTHER PUBLICATIONS

Taiwanese Office Action, dated Mar. 28, 2013 in a counterpart Taiwanese patent application, No. TW 099106533.

* cited by examiner

TRANSMITTER, RECEIVER AND EXTENDER SYSTEM

BACKGROUND OF THE INVENTION

1. Field of the Invention

The invention relates in general to a transmitter, a receiver and a signal extender system, and more particularly to a transmitter, a receiver and a signal extender system having a simple architecture and low cost.

2. Description of the Related Art

Transition minimized differential signaling (TMDS) is a transmission technology developed by Silicon Image, Inc. in the United States and is adapted to an image transmission interface, such as a high definition multimedia interface (HDMI) or a digital visual interface (DVI), to ensure stability of high speed serial data transmission.

Table 1 shows the transmission specifications (pin definition) of the transmission of digital video-audio signals according to the TMDS transmission technology.

TABLE 1

| Pin | Pin definition | Pin | Pin definition |
| --- | --- | --- | --- |
| 1 | TMDS Data 2+ | 2 | TMDS Data 2 Shield |
| 3 | TMDS Data 2− | 4 | TMDS Data 1+ |
| 5 | TMDS Data 1 Shield | 6 | TMDS Data 1− |
| 7 | TMDS Data 0+ | 8 | TMDS Data 0 Shield |
| 9 | TMDS Data 0− | 10 | TMDS Clock+ |
| 11 | TMDS Clock Shield | 12 | TMDS Clock− |
| 13 | CEC | 14 | Reserved |
| 15 | SCL | 16 | SDA |
| 17 | DDC/CEC Ground | 18 | +5V Power |
| 19 | Hot Plug Detect | | |

Many currently available video-audio apparatuses, such as setup boxes, DVD players, personal computers and liquid crystal display televisions, adopt the TMDS transmission technology to transmit digital video-audio signals to provide high-definition image frames. However, if a more expensive transmission interface, such as HDMI or DVI, is adopted to transmit the digital video-audio signals, the cost cannot be lowered. If network cables are adopted to transmit the digital video-audio signals, 12 channels corresponding to TMDS are needed. So, two network cables, each providing eight channels, are needed to transmit the complete digital video-audio signals. Because the two network cables have different lengths, the layout becomes difficult, and the transmitted digital video-audio signals may become skewed or have undesirable signal delay, resulting in the receiver generating error signals after demodulation.

In addition, the above-mentioned problem also occurs when a transmitting device compliant with the Displayport standard transmits the low-voltage differential signal (LVDS) and the associated low frequency or single-end/low frequency signal.

SUMMARY OF THE INVENTION

The present invention is directed to a transmitter, a receiver and a signal extender system, wherein a simple architecture (e.g., one that uses the mode property of the filter and the common mode signal) is utilized and the transition minimized differential signals (TMDS) or the low voltage differential signals (LVDS) are transmitted via a single network cable (e.g., CAT5/5e/6/7/7a or any other transmission medium with four twisted pairs) so that the cost is lowered and the layout is simplified.

According to a first aspect of the present invention, a transmitter including a signal input terminal, a plurality of loading units and a communication port is provided. The signal input terminal receives a digital video-audio signal, which includes a plurality of digital differential signals and a plurality of single-end/low frequency signals. Each loading unit mixes a single-end/low frequency signal and a digital differential signal to obtain a differential mixed signal. A frequency of the digital differential signal is higher than a frequency of the corresponding single-end/low frequency signal. The communication port outputs the plurality of differential mixed signals to a receiver via a network cable.

According to a second aspect of the present invention, a receiver including a communication port, a plurality of separating units and a signal output terminal is provided. The communication port receives a plurality of differential mixed signals from a transmitter via a network cable. Each separating unit separates a differential mixed signal into a digital differential signal and a corresponding single-end/low frequency signal. The signal output terminal outputs the digital differential signals and the single-end/low frequency signals as a digital video-audio signal.

According to a third aspect of the present invention, a signal extender system including a transmitter and a receiver is provided. The transmitter receives a digital video-audio signal, and respectively mixes a plurality of single-end/low frequency signals of the digital video-audio signal and a plurality of digital differential signals of the digital video-audio signal as multiple differential mixed signals. The receiver is coupled to the transmitter via a network cable, receives the differential mixed signals via the network cable, and separates the differential mixed signals into the digital differential signals and the single-end/low frequency signals, so as to obtain and output the digital video-audio signal.

The invention will become apparent from the following detailed description of the preferred but non-limiting embodiments. The following description is made with reference to the accompanying drawings.

DETAILED DESCRIPTION OF THE INVENTION

The invention provides a transmitter, a receiver and a signal extender system, wherein a simple architecture (e.g., one that uses the mode property of the filter and the common mode signal) is utilized and the digital video-audio signals are transmitted via a single network cable (e.g., CAT5/5e/6/7/7a or any other transmission medium with four twisted pairs) so that the cost is lowered and the layout is simplified. The digital video-audio signal may be a high definition multimedia interface (HDMI) signal, a digital visual interface (DVI) signal or a Displayport signal. The HDMI signal and DVI signal each comprise four transition minimized differential signaling (TMDS) signals, such as the digital differential signals TMDS Data 0 +/−, TMDS Data 1 +/−, TMDS Data 2 +/− or TMDS Clock +/−. The Displayport signal includes four low voltage differential signaling (LVDS) signals, such as digital differential signals LVDS Main Link Lane 0 p/n, LVDS Main Link Lane 1 p/n, LVDS Main Link Lane 2 p/n or LVDS Main Link Lane 3 p/n.

Figure 1:
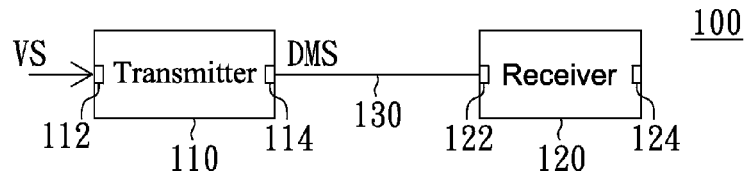
FIG. 1 is a block diagram showing a signal extender system according to a preferred embodiment of the invention.

FIG. 1 is a block diagram showing a signal extender system 100 according to a preferred embodiment of the invention. Referring to FIG. 1, the signal extender system 100 includes a transmitter 110 and a receiver 120. The receiver 120 is coupled to the transmitter 110 via a network cable 130, such as a CAT5/5e/6/7/7a cable. However, the network cable 130 is not particularly restricted, and all the transmission cables including four twisted pairs are still deemed as falling within the scope of the invention. The transmitter 110 is, for example, a local-end module, a video-audio switch, an AV splitter/broadcaster, a multi-video-audio managing apparatus or a keyboard, video and mouse (KVM) switch connected to an AV source. The receiver 120 is, for example, a remote-end module, a multi-video-audio managing apparatus or a keyboard, video and mouse (KVM) switch connected to an AV sink. However, the technological characteristic of the invention is not particularly restricted thereto.

The transmitter 110 has a signal receiving end 112 for receiving a digital video-audio signal VS from the AV source. The digital video-audio signal VS includes a plurality of single-end/low frequency signals and a plurality of digital differential signals. The frequency of the digital differential signals is higher than the frequency of the single-end/low frequency signals. The digital video-audio signal VS is, for example, a HDMI signal, a DVI signal or a Displayport signal, while the digital differential signal is, for example, TMDS or LVDS. The transmitter 110 respectively mixes the single-end/low frequency signals of the digital video-audio signal VS and the digital differential signals of the digital video-audio signal VS to form a plurality of differential mixed signals DMS. The transmitter 110 has a first communication port 114 for outputting the differential mixed signal DMS to the receiver 120 via the network cable 130.

The receiver 120 has a second communication port 122 for receiving, via the network cable 130, the differential mixed signals DMS outputted from the transmitter 110, and separates the differential mixed signals DMS into the original digital differential signals and the original single-end/low frequency signals to obtain the digital video-audio signal VS, and to output the digital video-audio signal VS to the AV sink via a signal output terminal 124.

Figure 2:
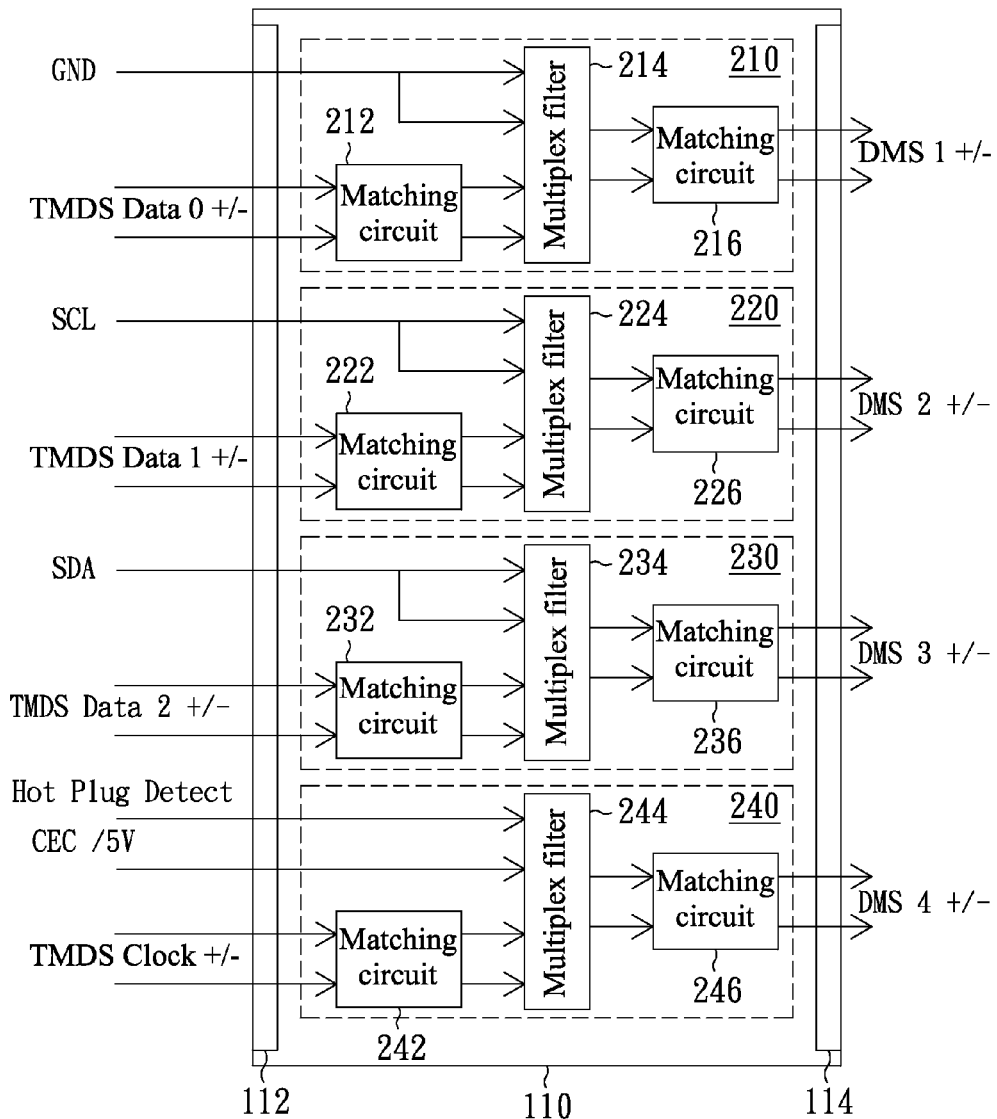
FIG. 2 is a block diagram showing a transmitter according to the preferred embodiment of the invention.

In the following, the non-limitative illustrations will be made by taking the digital video-audio signals VS being in form of the HDMI signal or the DVI signal as an example. FIG. 2 is a block diagram showing the transmitter 110 according to the preferred embodiment of the invention. Referring to FIG. 2, the transmitter 110 includes a signal input terminal 112, a plurality of loading units 210 to 240 and a first communication port 114. The signal input terminal 112 receives a digital video-audio signal, which includes multiple digital differential signals (e.g., TMDS Data 0 +/−, TMDS Data 1 +/−, TMDS Data 2 +/− and TMDS Clock +/−) and multiple single-end/low frequency signals (e.g., GND, serial clock line (SCL), serial data line (SDA), Consumer Electronics Control (CEC), Hot Plug Detect (HPD) or 5V). The loading units 210 to 240 respectively load the single-end/low frequency signals to the corresponding digital differential signals to obtain multiple differential mixed signals DMS 1 +/− to DMS 4 +/−. The first communication port 114 outputs the differential mixed signals DMS 1 +/− to DMS 4 +/− to the receiver 120 via the network cable 130.

In FIG. 2, the loading unit 210 includes matching circuits 212 and 216, and a multiplex filter 214. The matching circuit 212 receives the digital differential signal TMDS Data 0 +/−, and filters out the noise other than TMDS Data 0 +/− after performing impedance matching. The multiplex filter 214 functions as a high-pass filter to filter the digital differential signal TMDS Data 0 +/−, and as a low-pass filter to filter the corresponding single-end/low frequency signal GND and mixes the single-end/low frequency signal GND and the digital differential signal TMDS Data 0 +/−, thereby obtaining the differential mixed signal DMS 1 +/−. The matching circuit 216 performs impedance matching on the differential mixed signal DMS 1 +/− for filtering out the noise other than DMS 1 +/−, and outputs the DMS 1 +/− signal to a first pair of twist lines of the network cable 130 via the first communication port 114.

Similarly, in the loading unit 220, a matching circuit 222 receives the digital differential signal TMDS Data 1 +/−, and filters out the noise other than TMDS Data 1 +/− after performing impedance matching. A multiplex filter 224 functions as a high-pass filter to filter the digital differential signal TMDS Data 1 +/−, and as a low-pass filter to filter the corresponding single-end/low frequency signal SCL and mixes the single-end/low frequency signal SCL and the digital differential signal TMDS Data 1 +/−, thereby obtaining the differential mixed signal DMS 2 +/−. A matching circuit 226 performs impedance-matching on the differential mixed signal DMS 2 +/− to filter out the noise other than DMS 2 +/−, and outputs the DMS 2 +/− signal to a second pair of twist lines of the network cable 130 via the first communication port 114.

Similarly, in the loading unit 230, a matching circuit 232 receives the digital differential signal TMDS Data 2 +/−, and filters out the noise other than TMDS Data 2 +/− after performing impedance matching. A multiplex filter 234 functions as a high-pass filter to filter the digital differential signal TMDS Data 2 +/− and as a low-pass filter to filter the corresponding single-end/low frequency signal SDA, and mixes the single-end/low frequency signal SDA and the digital differential signal TMDS Data 2 +/−, thereby obtaining the differential mixed signal DMS 3 +/−. A matching circuit 236 performs impedance-matching on the differential mixed signal DMS 3 +/− to filter out the noise other than DMS 3 +/−, and outputs the DMS 3 +/− signal to a third pair of twist lines of the network cable 130 via the first communication port 114.

Similarly, in the loading unit 240, a matching circuit 242 receives the digital differential signal TMDS Clock +/−, and performs impedance matching for filtering out the noise other than TMDS Clock +/− after. A multiplex filter 244 functions as a high-pass filter to filter the digital differential signal TMDS Clock +/− and as a low-pass filter to filter the corresponding single-end/low frequency signals Hot Plug Detect (HPG) and CEC/5V, and mixes the single-end/low frequency signals HPG and CEC/5V and the digital differential signal TMDS Clock +/−, thereby obtaining the differential mixed signal DMS 4 +/−. A matching circuit 246 performs impedance-matching on the differential mixed signal DMS 4 +/− to filter out the noise other than DMS 4 +/−, and outputs the DMS 4 +/− signal to a fourth pair of twist lines of the network cable 130 via the first communication port 114.

In fact, the load matching between the single-end/low frequency signal (GND, SCL, SDA, Hot Plug Detect, CEC or 5V) and the digital differential signal (TMDS Data 0 +/−, TMDS Data 1 +/−, TMDS Data 2 +/− or TMDS Clock +/−)

performed by the loading units 210 to 240 is not restricted to the relationship of one-to-one or two-to-one, as shown in FIG. 2, and the matched combination of one-to-one or one-to-two between the digital differential signal and the single-end/low frequency signal may be arbitrarily performed. The multiplex filters 214, 224, 234 and 244 may be duplex filters.

FIGS. 3A to 3D are circuit diagrams respectively showing the loading units 210 to 240 according to the preferred embodiment of the invention. However, the technological characteristic of the invention is not limited thereto. The loading units 210 to 240 respectively mix the plurality of single-end/low frequency signals and the corresponding plurality of the digital differential signals to obtain the plurality of differential mixed signals DMS 1 +/− to DMS 4 +/−. So, the transmitter 110 can output the digital video-audio signal containing the digital differential signals (TMDS Data 0 +/−, TMDS Data 1 +/−, TMDS Data 2 +/− or TMDS Clock +/−) and the single-end/low frequency signals (GND, SCL, SDA, Hot Plug Detect, CEC or 5V) to the receiver 120 via the single network cable 130 having four twisted pairs.

Figure 3A:
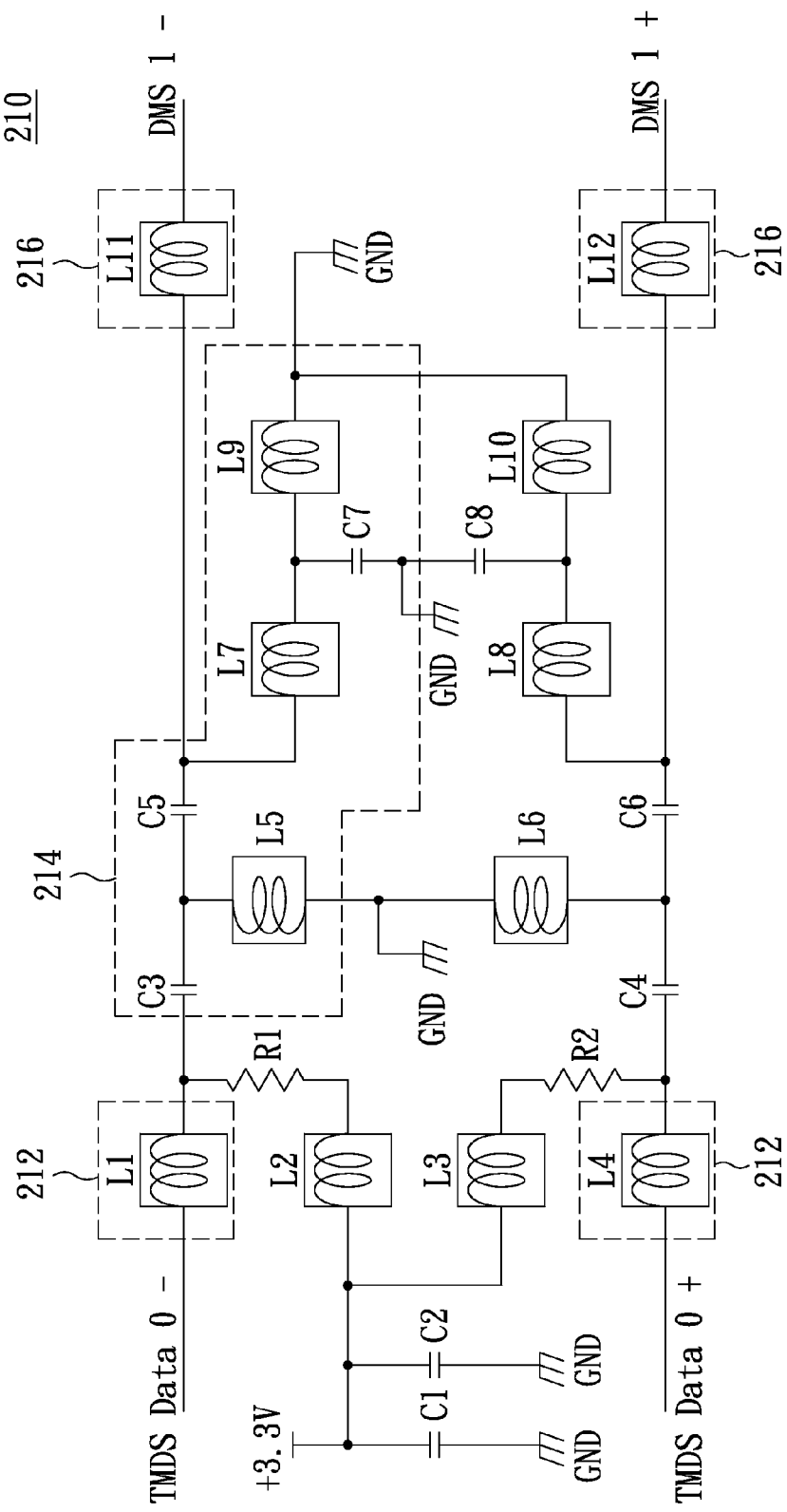
FIGS. 3A to 3D are circuit diagrams respectively showing loading units 210 to 240 according to the preferred embodiment of the invention.
Figure 3B:
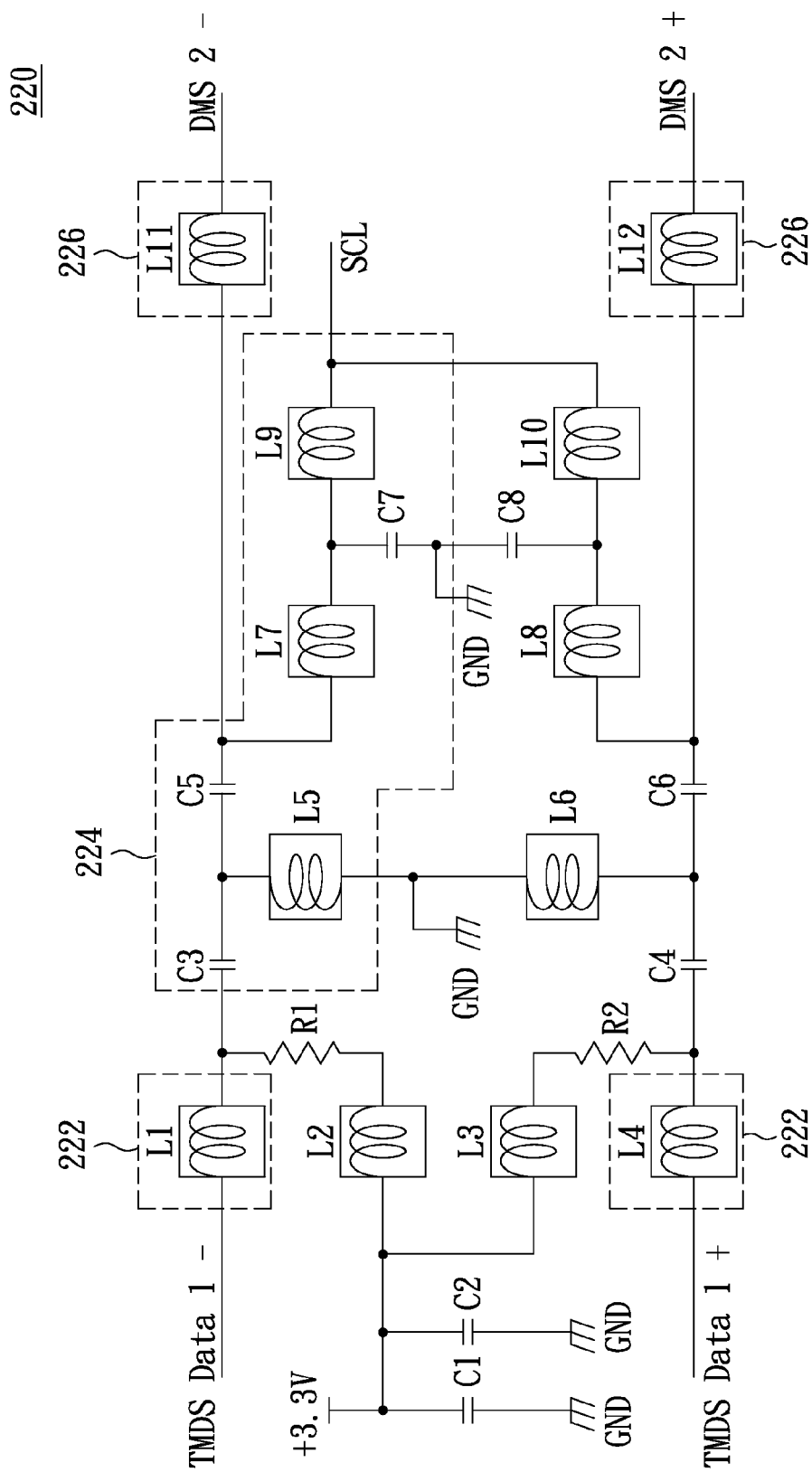
Figure 3C:
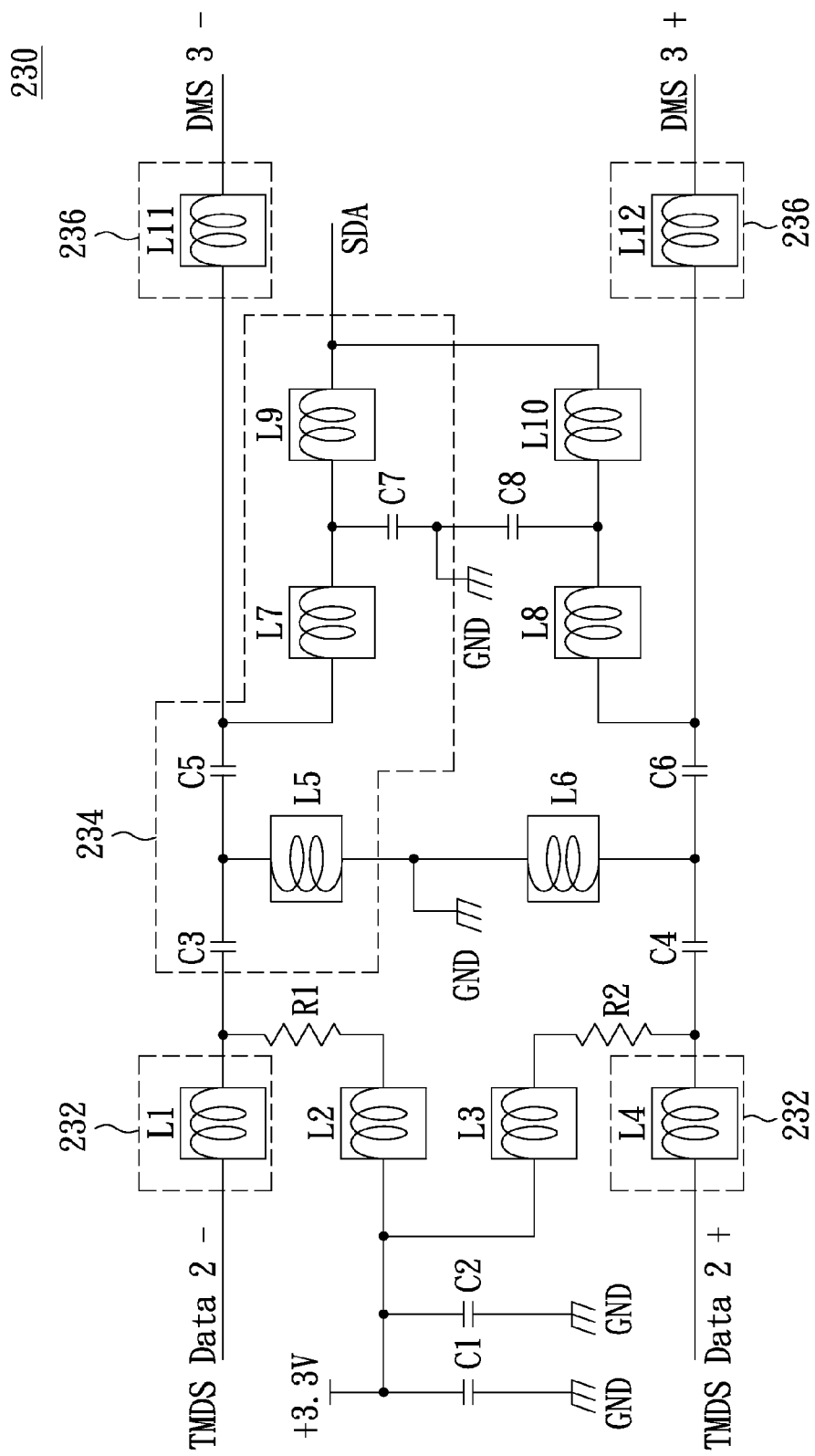
Figure 3D:
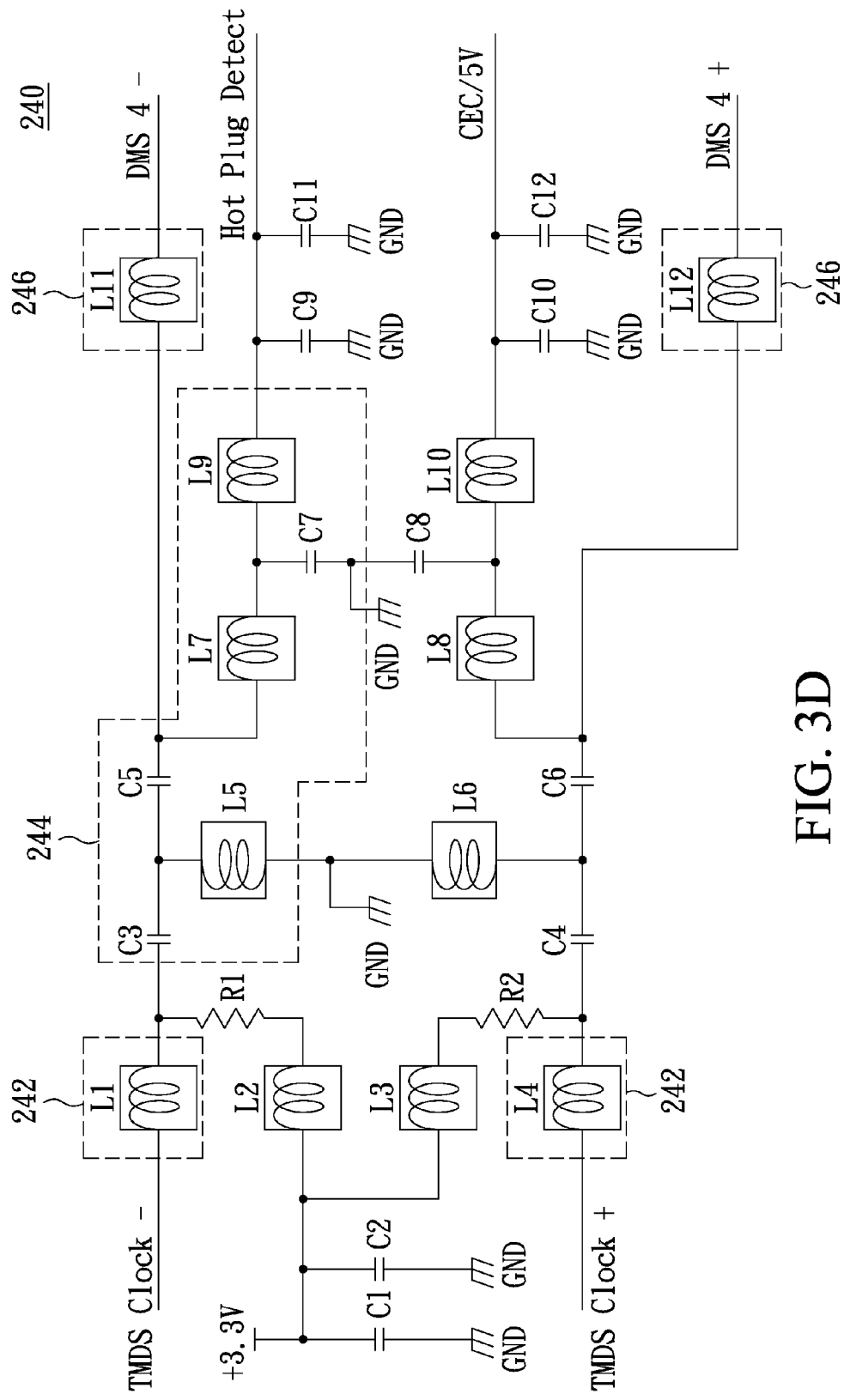
Figure 3E:
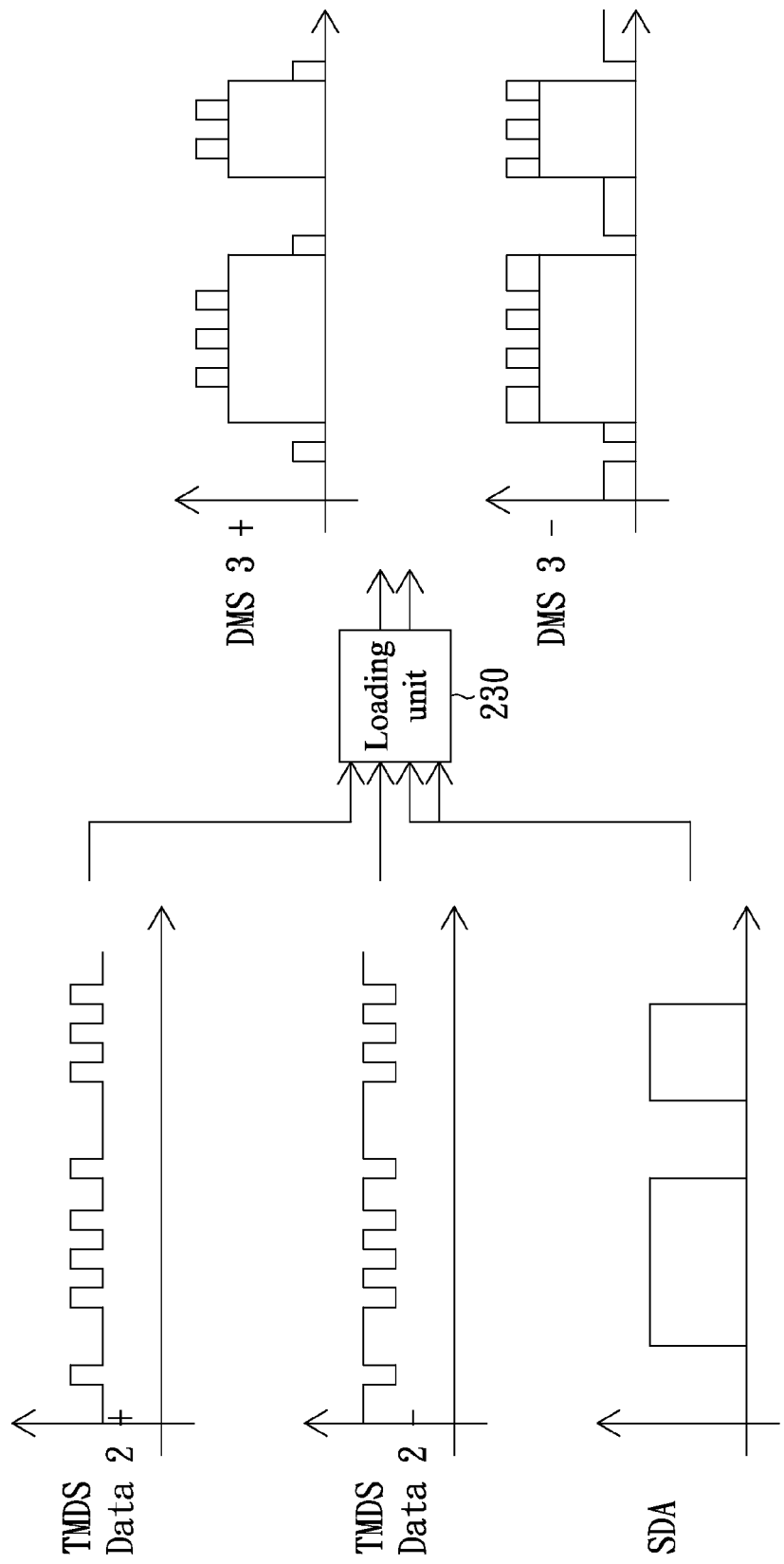
FIG. 3E shows the waveforms before and after the signals are processed by the loading unit according to the preferred embodiment of the invention.

FIG. 3E shows the waveforms before and after the loading unit processes the signals according to the preferred embodiment of the invention. In the embodiment of FIG. 3E, the loading unit 230 is illustrated as an example for explanation. The loading unit 230 mixes the single-end/low frequency signal SDA and the digital differential signal TMDS Data 2 +/− for obtaining the differential mixed signal DMS 3 +/−. The single-end/low frequency signal SDA, the digital differential signal TMDS Data 2 +/− and the differential mixed signal DMS 3 +/− have the waveforms shown in FIG. 3E. In addition, it is also concluded that the waveforms before and after the loading units 210, 220 and 240 process the signals are the same as those before and after the loading unit 230 processes the signal, so detailed descriptions thereof will be omitted. In this embodiment, it is also possible that only the multiplex filters 214, 224, 234 and 244 process the digital differential signals and the single-end/low frequency signals, and output the above-mentioned differential mixed signals.

Figure 4:
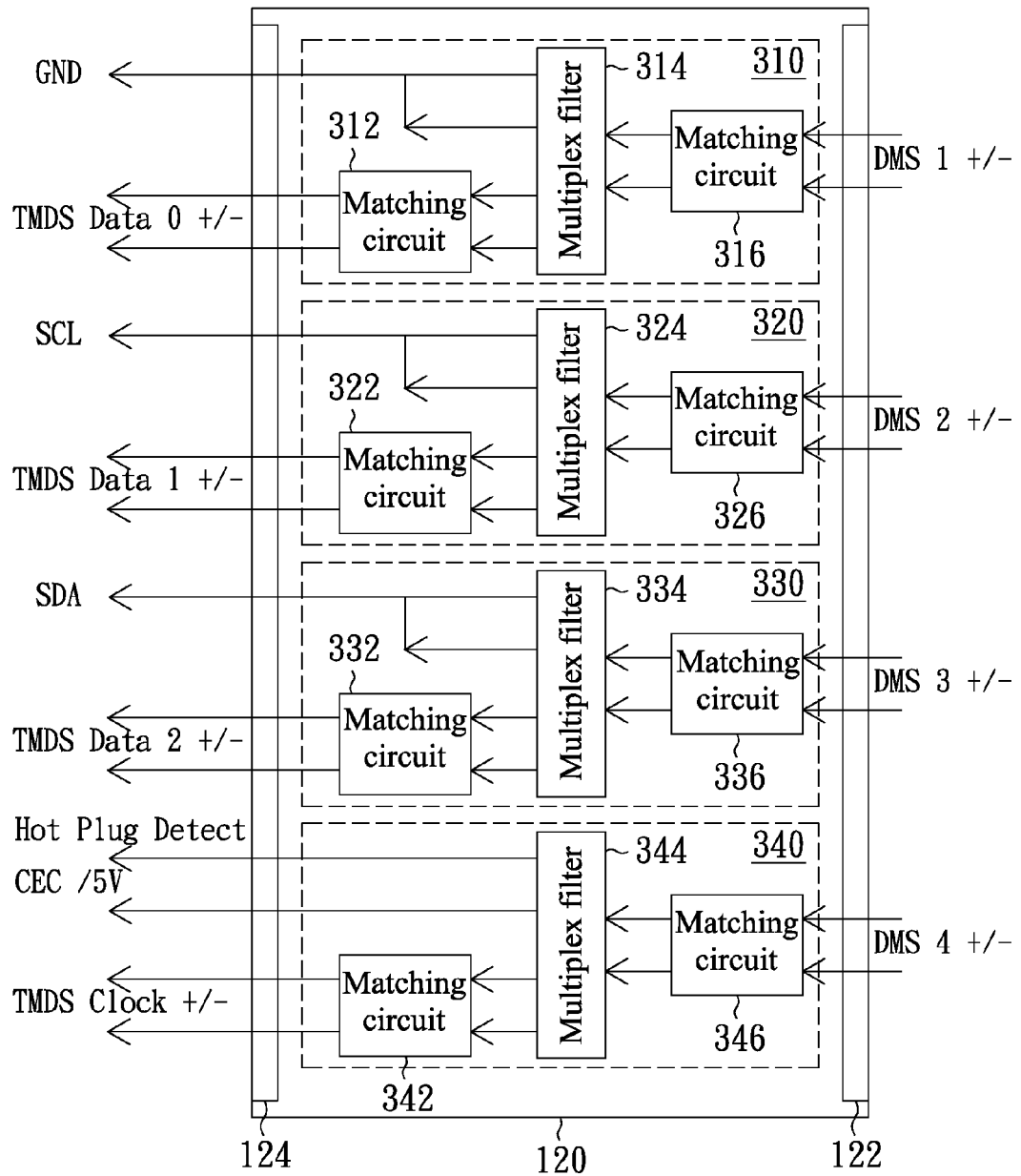
FIG. 4 is a block diagram showing a receiver according to the preferred embodiment of the invention.

FIG. 4 is a block diagram showing a receiver according to the preferred embodiment of the invention. As shown in FIG. 4, the receiver 120 comprises a second communication port 122, multiple separating units 310 to 340 and a signal output terminal 124. The second communication port 122 receives multiple differential mixed signals DMS 1 +/− to DMS 4 +/− from the transmitter 110 via the network cable 130. For instance, the second communication port 122 correspondingly receives the differential mixed signals DMS 1 +/− to DMS 4 +/− via the four twisted pairs of the network cable 130. The separating units 310 to 340 respectively separate the differential mixed signals DMS 1 +/− to DMS 4 +/− into the plurality of digital differential signals (TMDS Data 0 +/−, TMDS Data 1 +/−, TMDS Data 2 +/− or TMDS Clock +/−) and the plurality of corresponding single-end/low frequency signals (GND, SCL, SDA, Hot Plug Detect, CEC or 5V). The signal output terminal 124 outputs the digital differential signals and the single-end/low frequency signals to constitute a digital video-audio signal, so that the AV sink can play the received digital video-audio signal.

Referring to FIG. 4, the separating unit 310 includes matching circuit 312 and 316, and a multiplex filter 314. The matching circuit 316 receives the differential mixed signal DMS 1 +/− via a second network port 122 from the first pair of twist lines of the network cable, and performs impedance matching for filtering out the noise other than DMS 1 +/−. The multiplex filter 314 functions as a high-pass filter to filter the differential mixed signal DMS 1 +/− to obtain the digital differential signal TMDS Data 0 +/−, and as a low-pass filter to filter the differential mixed signal DMS 1 +/− to obtain the single-end/low frequency signal GND, and outputs the single-end/low frequency signal GND to the signal output terminal 124. The matching circuit 312 receives TMDS Data 0 +/− and performs impedance matching on TMDS Data 0 +/− for filtering out the noise other than TMDS Data 0 +/− so as to output the digital differential signal TMDS Data 0+/− to the signal output terminal 124.

Similarly, the separating unit 320 includes a matching circuit 322 and 326, and a multiplex filter 324. The matching circuit 326 receives the differential mixed signal DMS 2 +/− from the second pair of twist lines of the network cable via the second network port 122 and performs impedance matching for filtering out the noise other than DMS 2 +/−. The multiplex filter 324 functions as a high-pass filter to filter the differential mixed signal DMS 2 +/− to obtain the digital differential signal TMDS Data 1 +/−, and as a low-pass filter to filter the differential mixed signal DMS 2 +/− to obtain the single-end/low frequency signal SCL, and outputs the single-end/low frequency signal SCL to the signal output terminal 124. The matching circuit 322 receives TMDS Data 1 +/− and performs impedance matching on TMDS Data 1 +/− for filtering out the noise other than TMDS Data 1 +/− so as to output the digital differential signal TMDS Data 1 +/− to the signal output terminal 124.

Similarly, the separating unit 330 includes a matching circuit 332 and 336, and a multiplex filter. The matching circuit 336 receives the differential mixed signal DMS 3 +/− from the third pair of twist lines of the network cable via the second network port 122, and performs impedance matching for filtering out the noise other than DMS 3 +/−. The multiplex filter 334 functions as a high-pass filter to filter the differential mixed signal DMS 3 +/− to obtain the digital differential signal TMDS Data 2 +/−, and as a low-pass filter to filter the differential mixed signal DMS 3 +/− to obtain the single-end/low frequency signal SDA, and outputs the single-end/low frequency signal SDA to the signal output terminal 124. The matching circuit 332 receives TMDS Data 2 +/− and performs impedance matching on TMDS Data 2 +/− for filtering out the noise other than TMDS Data 2 +/− so as to output the digital differential signal TMDS Data 2 +/− to the signal output terminal 124.

Similarly, the separating unit 340 includes a matching circuit 342 and 346, and a multiplex filter 344. The matching circuit 346 receives the differential mixed signal DMS 4 +/− from the fourth pair of twist lines of the network cable via the second network port 122, and performs impedance matching for filtering out the noise other than DMS 4 +/−. The multiplex filter 344 functions as a high-pass filter to filter the differential mixed signal DMS 4 +/− to obtain the digital differential signal TMDS Clock +/−, and as a low-pass filter to filter the differential mixed signal DMS 4 +/− to obtain the single-end/low frequency signals Hot Plug Detect and CEC/5V, and outputs the single-end/low frequency signals Hot Plug Detect and CEC/5V to the signal output terminal 124. The matching circuit 342 receives TMDS Clock +/− and performs impedance matching on TMDS Clock +/− for filtering out the noise other than TMDS Clock +/− so as to output the digital differential signal TMDS Clock +/− to the signal output terminal 124.

The multiplex filters 314, 324, 334 and 344 may be duplex filters. In addition, the circuit of each separating unit may also be designed according to the circuit of the loading unit. Besides, the matching circuit may have an inductor layout (i.e. a circuit including inductors). Furthermore, the multiplex filter may have an inductor layout and a capacitor layout combined together (i.e., a circuit having both inductors and capacitors).

In addition, if the digital video-audio signal VS is the Displayport signal, then the digital differential signals may be, for example, LVDS Main Link Lane 0 (p/n), LVDS Main Link Lane 1 (p/n), LVDS Main Link Lane 2 (p/n), LVDS Main Link Lane 3 (p/n) and the like, while the single-end/low frequency signals may be, for example, GND, AUX CH(p), AUX CH(n), Hot Plug Detect (HPG), Displayport (DP) Power and the like. The load matching for selecting the single-end/low frequency signal loaded to the digital differential signal, and the digital differential signal may be one-to-one or two-to-one, and is not particularly restricted, which may be determined by the designer.

The transmitter, the receiver and the signal extender system according to the embodiment of the invention have many advantages, some of which will be listed in the following.

The transmitter, the receiver and the signal extender system of the invention have a simple architecture using the loading units to mix the single-end/low frequency signals of the digital video-audio signal and the corresponding digital differential signals, and using the separating units to separate the differential mixed signals into the digital differential signals and the single-end/low frequency signals. Thus, the digital video-audio signal with the single-end/low frequency signals and the digital differential signals may be transmitted via one single network cable, so that the cost is advantageously lowered and the layout is advantageously simplified.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A transmitter, comprising:
a signal input terminal for receiving a digital video-audio signal from a source, which comprises a plurality of digital differential signals and a plurality of single-end/low frequency signals;
a plurality of first loading units for generating a plurality of first differential mixed signals, each first loading unit including a first multiplex filter for low-pass filtering one of the plurality of single-end/low frequency signals from the source and high-pass filtering one of the plurality of digital differential signals from the source and mixing the filtered single-end/low frequency signal and the filtered digital differential signal to obtain one of the plurality of first differential mixed signals, wherein the filtered single-end/low frequency signal and the filtered digital differential signal are superimposed onto each other and simultaneously present in the first differential mixed signal; and
a communication port for outputting the first differential mixed signals.

2. The transmitter according to claim 1, wherein each of the first loading units further comprises:
a first matching circuit for receiving one of the digital differential signals and performing impedance matching on the digital differential signal; and
a second matching circuit for performing impedance-matching on the first differential mixed signal and then outputting the impedance-matched first differential mixed signal via the communication port.

3. The transmitter according to claim 1, wherein the plurality of digital differential signals are transition minimized differential signaling (TMDS) signals or low voltage differential signaling (LVDS) signals, and the plurality of single-end/low frequency signals are a signal combination combining signals selected from a group consisting of GND, SCL, SDA, Consumer Electronics Control (CEC), Hot Plug Detect (HPD), 5V, AUX CH(p), AUC CH(n), and Displayport (DP) Power.

4. The transmitter according to claim 1, wherein a frequency of each of the plurality of digital differential signals being loaded with a single-end/low frequency signal is higher than a frequency of the corresponding single-end/low frequency signal.

5. The transmitter according to claim 1, wherein the first differential mixed signals are outputted via a network cable, which is a CAT5/5e/6/7/7a cable or has four twisted pairs.

6. The transmitter according to claim 1, wherein the transmitter is a local-end module, a video-audio switch, an AV splitter/broadcaster, a multi-video-audio manager, or a keyboard, video and mouse (KVM) switch.

7. The transmitter according to claim 1, further comprising a second loading unit for generating a second differential mixed signal including a second multiplex filter for low-pass filtering at least two of the single-end/low frequency signals from the source and high-pass filtering one of the plurality of digital differential signals from the source and mixing the at least two low-pass filtered single-end/low frequency signals and the high-pass filtered digital differential signal to obtain the second differential mixed signal output from the communication port.

* * * * *